US012481706B2

(12) United States Patent
Cui et al.

(10) Patent No.: US 12,481,706 B2
(45) Date of Patent: Nov. 25, 2025

(54) METHOD AND APPARATUS FOR SENDING INFORMATION

(71) Applicant: Baidu Online Network Technology (Beijing) Co., Ltd., Beijing (CN)

(72) Inventors: Lijuan Cui, Beijing (CN); Yudong Li, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 279 days.

(21) Appl. No.: 17/303,060

(22) Filed: May 19, 2021

(65) Prior Publication Data

US 2021/0271720 A1 Sep. 2, 2021

Related U.S. Application Data

(63) Continuation of application No. PCT/CN2020/116528, filed on Sep. 21, 2020.

(30) Foreign Application Priority Data

Mar. 31, 2020 (CN) .......................... 202010247322.1

(51) Int. Cl.
*G06F 16/9038* (2019.01)
*G06F 16/904* (2019.01)
(Continued)

(52) U.S. Cl.
CPC ........ *G06F 16/9038* (2019.01); *G06F 16/904* (2019.01); *G06F 16/906* (2019.01);
(Continued)

(58) Field of Classification Search
CPC .. G06F 16/9038; G06F 16/906; G06F 16/904; G06F 16/951; G06F 16/9538;
(Continued)

(56) References Cited

U.S. PATENT DOCUMENTS 7,603,348 B2 * 10/2009 He .................... G06F 16/24575
9,213,765 B2 12/2015 Wong et al.
(Continued)

FOREIGN PATENT DOCUMENTS

CN 101052181 10/2007
CN 101145153 3/2008
(Continued)

OTHER PUBLICATIONS

May 16, 2022 Extended European Search Report from EP 20886169.0 (8 pgs).

(Continued)

*Primary Examiner* — Evan Aspinwall
(74) *Attorney, Agent, or Firm* — Knobbe, Martens, Olson & Bear, LLP

(57) ABSTRACT

Embodiments of the present application provides a method and apparatus for sending information. A specific implementation of the method includes: identifying search information input through a terminal by a user, to obtain the user's demand; acquiring, based on the user's demand, at least one information card from at least one category of preset information set, where the information set includes information and information cards used to describe the information; performing information search based on the search information, to obtain a search result; screening, based on feature information of the search result, the at least one information card to obtain a target information card; and sending to-be-displayed information to the terminal based on the target information card and the search result.

16 Claims, 5 Drawing Sheets

(51) Int. Cl.
  *G06F 16/906* (2019.01)
  *G06F 16/908* (2019.01)
  *G06F 16/951* (2019.01)
  *G06F 16/9538* (2019.01)
  *G06F 18/22* (2023.01)
  *G06N 20/00* (2019.01)

(52) U.S. Cl.
  CPC .......... *G06F 16/908* (2019.01); *G06F 16/951* (2019.01); *G06F 16/9538* (2019.01); *G06F 18/22* (2023.01); *G06N 20/00* (2019.01)

(58) Field of Classification Search
  CPC .... G06F 16/908; G06F 18/22; G06F 16/9535; G06F 16/93; G06F 16/338; G06F 16/34; G06F 16/9532; G06F 40/216; G06F 40/295; G06N 20/00
  USPC .......................................................... 707/706
  See application file for complete search history.

(56) References Cited

U.S. PATENT DOCUMENTS

| | | | | |
|---|---|---|---|---|
| 9,996,626 | B1* | 6/2018 | Bailey | G06F 16/9535 |
| 10,410,224 | B1* | 9/2019 | Levanon | G06Q 30/02 |
| 10,620,801 | B1* | 4/2020 | Fein | G06F 3/04842 |
| 10,706,450 | B1* | 7/2020 | Tavernier | G06F 16/9535 |
| 10,733,197 | B2 | 8/2020 | Lin et al. | |
| 2010/0223257 | A1* | 9/2010 | Milic-Frayling | G06F 16/9535 707/769 |
| 2012/0076414 | A1* | 3/2012 | Xu | G06F 16/9038 707/769 |
| 2013/0060755 | A1* | 3/2013 | He | G06F 16/9535 707/E17.082 |
| 2013/0283140 | A1* | 10/2013 | Wu | G06F 16/951 715/207 |
| 2014/0172652 | A1* | 6/2014 | Pobbathi | G06Q 10/087 705/28 |
| 2015/0108213 | A1* | 4/2015 | Sasaki | G06Q 30/0633 235/383 |
| 2015/0278266 | A1* | 10/2015 | Tang | G06F 16/2228 707/711 |
| 2015/0324361 | A1 | 11/2015 | Glass et al. | |
| 2017/0371883 | A1* | 12/2017 | Bailiang | H04B 1/3827 |
| 2018/0342003 | A1* | 11/2018 | Siddiqui | G06Q 30/0627 |
| 2019/0325062 | A1* | 10/2019 | Rogulenko | G06F 16/2343 |
| 2020/0143102 | A1* | 5/2020 | Ziraknejad | G06F 21/31 |
| 2020/0159861 | A1* | 5/2020 | Baeck | H04L 63/0876 |
| 2020/0210647 | A1* | 7/2020 | Panuganty | G06N 20/10 |
| 2020/0226169 | A1* | 7/2020 | Zhang | G06F 16/29 |
| 2021/0049165 | A1* | 2/2021 | Najork | G06F 16/38 |
| 2021/0118024 | A1* | 4/2021 | Sollami | G06N 3/02 |
| 2021/0133269 | A1* | 5/2021 | Shah | G06F 16/248 |
| 2021/0224321 | A1* | 7/2021 | Chiarandini | G06F 16/738 |
| 2022/0222418 | A1* | 7/2022 | Ziraknejad | G06Q 10/10 |

FOREIGN PATENT DOCUMENTS

| | | | |
|---|---|---|---|
| CN | 101331475 | | 12/2008 |
| CN | 101477557 | | 7/2009 |
| CN | 101694656 | | 4/2010 |
| CN | 104239481 | | 12/2014 |
| CN | 104503980 | | 4/2015 |
| CN | 105138535 | | 12/2015 |
| CN | 110765275 | | 12/2015 |
| CN | 105354225 | | 2/2016 |
| CN | 105426436 | | 3/2016 |
| CN | 105786969 | | 7/2016 |
| CN | 105893343 | | 8/2016 |
| CN | 106649780 | | 5/2017 |
| CN | 107577807 | | 1/2018 |
| CN | 107885872 | | 4/2018 |
| CN | 107992602 | | 5/2018 |
| CN | 109344336 | | 2/2019 |
| CN | 109522465 | | 3/2019 |
| CN | 109949124 | | 6/2019 |
| CN | 110309431 | | 10/2019 |
| CN | 111475722 | | 7/2020 |
| EP | 2740053 | A1 | 6/2014 |
| EP | 2740053 | B1 * | 6/2019 .......... G06F 16/248 |
| JP | 2014-522056 | | 8/2014 |
| JP | 2015-153158 | | 8/2015 |

OTHER PUBLICATIONS

International Search Report of Sep. 21, 2020 for International Patent Application No. PCT/CN2020/116528. 11 pages.

* cited by examiner

METHOD AND APPARATUS FOR SENDING INFORMATION

CROSS-REFERENCE TO RELATED APPLICATIONS

This application is a continuation of International Application No. PCT/CN2020/116528, filed on Sep. 21, 2020, which claims priority to Chinese Patent Application No. 202010247322.1, filed with the China National Intellectual Property Administration (CNIPA) on Mar. 31, 2020, each of which is incorporated herein by reference in its entirety.

TECHNICAL FIELD

Embodiments of the present disclosure relate to the field of computer technology, particularly to a method and apparatus for sending information.

BACKGROUND

In the existing search scenario of certain vertical industries, cards are used as an entry for accessing detailed information. Cards may contain rich information such as pictures, text, links and the like. When issuing cards to a user, it is necessary to identify the user's demand first, and then cards are issued to the user according to the identified user's demand. When identifying the user's demand, if the user's demand is not identified accurately, the card issued to the user may not meet the user's demand, thus damaging the user's search experience.

SUMMARY

Embodiments of the present disclosure provide a method and apparatus for sending information.

According to a first aspect, some embodiments of the present disclosure provide a method for sending information, the method for sending information includes: identifying search information input through a terminal by a user, to obtain the user's demand; acquiring, based on the user's demand, at least one information card from at least one category of preset information set, where the information set includes information and information cards used to describe the information; performing information search based on the search information to obtain a search result; screening, based on feature information of the search result, the at least one information card to obtain a target information card; and sending to-be-displayed information to the terminal based on the target information card and the search result.

In some embodiments, the screening, based on the feature information of the search result, the at least one information card to obtain the target information card includes: performing a first screening on an information card of the at least one information card, including: inputting the feature information, statistics for a category of the at least one information card, and the category of the information card into a predetermined to-be-used screening model, to obtain screening information for the information card; determining whether the information card is the target information card according to the obtained screening information for the information card.

In some embodiments, the screening step further includes determining the to-be-used screening model from at least one pre-trained screening model according to the category of the information card, where a screening model is used to characterize a corresponding relationship between the screening information and feature information, the statistics for the category of the at least one information card, a category of an information card.

In some embodiments, the screening information includes display and non-display, and the determining whether the information card is the target information card according to the obtained screening information for the information card includes: determining that the information card is the target information card, in response to determining that the screening information for the information card is display; determining that the information card is not the target information card, in response to determining that the screening information for the information card is non-display.

In some embodiments, the screening, based on the feature information of the search result, the at least one information card to obtain the target information card includes: performing a second screening on an information card of the at least one information card, including: matching the feature information and a category of the information card with a preset feature combination; determining whether the information card is the target information card according to result of the marching.

In some embodiments, the sending the to-be-displayed information to the terminal based on the target information card and the search result includes: scoring the target information card and the search result based on similarities with the search information and attribute information, and sorting the target information card and the search result according to results of the scoring; and sending the sorted target information card and search result to the terminal as the to-be-displayed information.

In some embodiments, the performing information search based on the search information to obtain the search result includes: segmenting the search information to obtain at least one segmented word; and searching information from Internet data based on the obtained at least one segmented word, to obtain the search result.

According to a second aspect, some embodiments of the present disclosure provide an apparatus for sending information, the apparatus for sending information includes: an identification unit, configured to identify search information input through a terminal by a user, to obtain the user's demand; an acquisition unit, configured to acquire at least one information card from a at least one category of preset information set based on the user's demand, where the information set includes information and information cards used to describe the information; a search unit, configured to perform information search based on the search information to obtain a search result; a screening unit, configured to screen the at least one information card to obtain a target information card based on feature information of the search result; a sending unit, configured to send to-be-displayed information to the terminal based on the target information card and the search result.

In some embodiments, the screening unit includes a first execution unit which are configured to perform a preset first screening on an information card of the at least one information card, where the first execution unit includes: an input unit, configured to input the feature information, statistics for a category of the at least one information card, and a category of the information card into a predetermined to-be-used screening model, to obtain screening information for the information card; a card determination unit, configured to determine whether the information card is the target information card based on the obtained screening information for the information card.

In some embodiments, the first execution unit further includes: a determination unit, configured to determine the to-be-used screening model from at least one pre-trained screening model based on the category of the information card, where a screening model is used to characterize a corresponding relationship between the screening information and feature information, the statistics for the category of the at least one information card, a category of an information card.

In some embodiments, the screening information includes display and non-display; the card determination unit further configured to: determine that the information card is the target information card, in response to determining that the screening information for the information card is display; determine that the information card is not the target information card, in response to determining that the screening information for the information card is non-display.

In some embodiments, the screening unit includes a second execution unit which is configured to perform a second screening on an information card of the at least one information card, the second screening including: matching the feature information and a category of the information card with a preset feature combination; determining whether the information card is the target information card based on result of the marching.

In some embodiment, the sending unit is further configured to: score the target information card and the search result based on a similarities with the search information and attribute information, and sort the target information card and the search results according to the scoring results; and send the sorted target information card and search result to the terminal as the to-be-displayed information.

In some embodiment, the screening unit is further configured to: segment the search information to obtain at least one segmented word; and search information from Internet data based on the obtained at least one segmented word, to obtain the search result.

According to a third aspect, some embodiments of the present disclosure provide a server, including: one or more processors; a storage device, on which one or more programs are stored, the one or more programs, when executed by the one or more processors, cause the one or more processors to implement the method according to any one of the implementations in the first aspect.

According to a fourth aspect, some embodiments of the present disclosure provide a computer-readable medium, on which a computer program is stored, where the computer program is executed by a processor to implement the method according any one of the implementations in the first aspect.

BRIEF DESCRIPTION OF THE DRAWINGS

The other features, purposes, and advantage of this disclosure will become more apparent by reading a detailed description of non-limiting embodiments with reference to the figures below.

DETAILED DESCRIPTION

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

Figure 1:
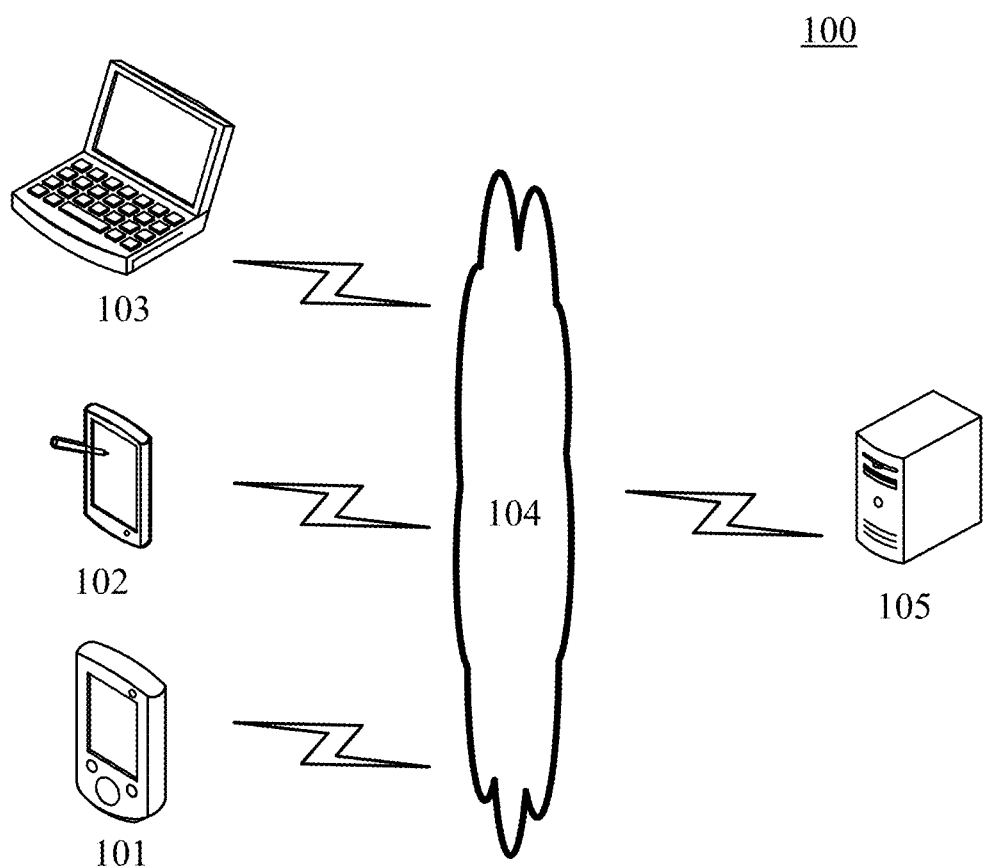
FIG. 1 is an example system architecture in which an embodiment of the present disclosure may be applied.

FIG. 1 illustrates an example system architecture 100 in which a method or an apparatus for sending information according to an embodiment of the present disclosure may be applied.

As illustrated in FIG. 1, the system architecture 100 may include terminal devices 101, 102, 103, a network 104, and a server 105. The network 104 serves as a medium for providing a communication link among the terminal devices 101, 102, 103 and the server 105. The network 104 may include various types of connections, such as wired, wireless communication links, or fiber optic cables.

A user may interact with the server 105 through the network 104 by using the terminal devices 101, 102, 103 to receive or send information, etc. Various applications may be installed on the terminal devices 101, 102, 103, such as search engines, web browser applications, shopping applications, search applications, instant messaging tools, email clients, social platform software.

The terminal devices 101, 102, 103 may be hardware or software. When the terminal devices 101, 102, 103 are hardware, they may be various electronic devices having a display screen and supporting information searching, including but not limited to a smart phone, a tablet computer, a laptop computer, a desktop computer, and the like. When the terminal devices 101, 102, and 103 are software, they may be installed in the electronic devices listed above. They may be implemented as a plurality of software or software modules (for example, for providing distributed services), or as a single software or software module, which is not specifically limited herein.

The server 105 may be a server providing various services, such as a backend server providing a support to the information displayed on the terminal devices 101, 102, 103. The backend server may process, for example, analyze, the received data such as the search information, and feed the processing result (such as to-be-displayed information) back to the terminal device.

It should be noted that the server 105 may be hardware or software. When the server is hardware, it may be implemented as a distributed server cluster composed of multiple servers, or may be implemented as a single server. When the server is software, it may be implemented as a plurality of software or software modules (for example, for providing distributed services), or as a single software or software module, which is not specifically limited herein.

It shall be understood that the numbers of the terminal devices, networks and the servers in FIG. 1 are merely illustrative. Depending on the implementation needs, there may be any number of terminal devices, networks, and servers.

It should be noted that the method for sending information provided by embodiments of the present disclosure is generally executed by the server 105, and accordingly, the device for sending information is generally provided in the server 105.

Figure 2:
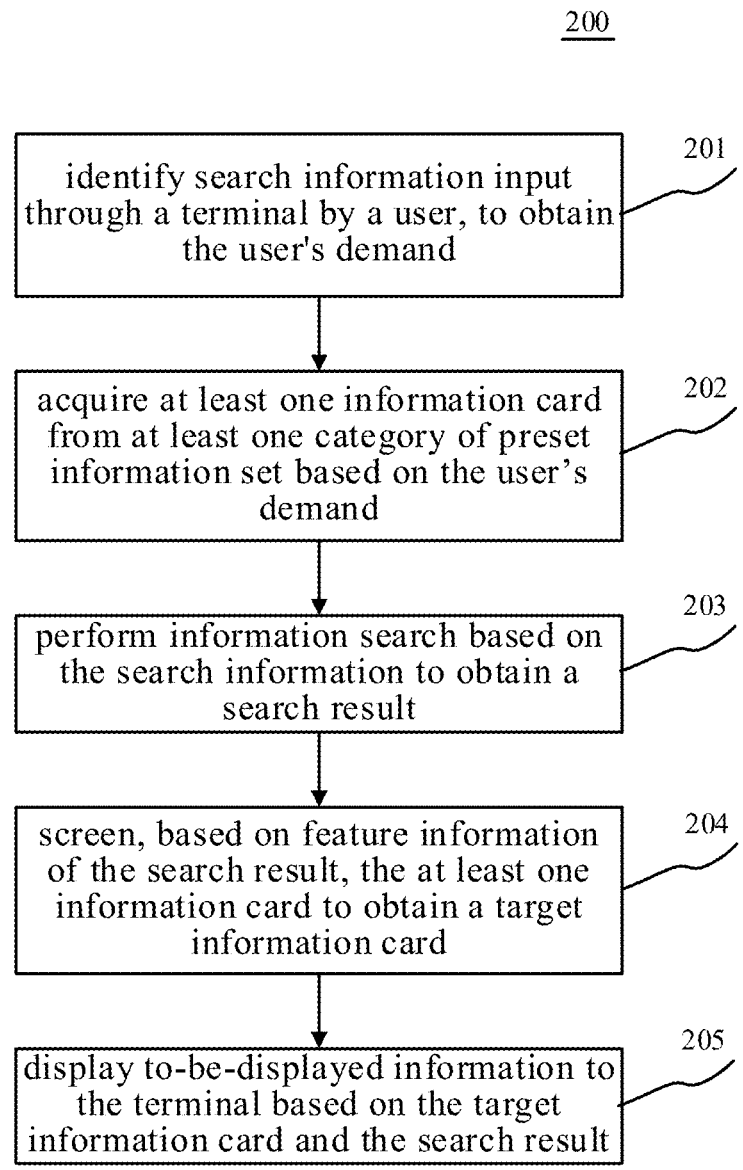
FIG. 2 is a flow chart of a method for sending information according to an embodiment of the present disclosure.

Continuing to refer to FIG. 2, a flow of the method 200 for sending information according to an embodiment of the present disclosure is illustrated. The method for sending information includes following steps.

Step 210: identifying search information input through a terminal by a user, to obtain the user's demand.

In this embodiment, the execution entity (for example, the server 105 shown in FIG. 1) of the method for sending information may receive, via a wired or wireless connection, search information from the terminal through which a user searches for information. The search information is information input by the user for information search. The execution entity may obtain the user's demand by performing demand identification on the received search information. As an example, the execution entity may identify the user's demand based on vocabulary matching, may also identify the demand based on features such as the user's search, view, and click, as well as identify the demand based on neural network models.

Step 202: acquiring, based on the user's demand, at least one information card from at least one category of preset information set, where the information set includes information and information cards used to describe the information.

In this embodiment, the execution entity may acquire at least one information card from at least one category of preset information set based on the user's demand identified in step 201. Here, the execution entity may establish a corresponding information set for each of at least one category. The information set may include information and information cards used to describe the information. Here, the information card may be the result of integrating and visualizing information. Taking the category of film and television as an example, the information card for the category of film and television may integrate information such as the play link, cast list, evaluation, and purchase of the film. An information card may be used as an entry to information, and the information card may contain pictures, text, links, and so on. In this way, the execution entity may obtain an information card from the information collection corresponding to each category according to the user's demand, thereby obtaining at least one information card. As an example, the execution entity may search for information that meets the user's demand from the information collection of each category based on the identified user's demand, and acquire the information card corresponding to the information that meets the user's demand. Here, the aforementioned at least one category may include, but is not limited to: commodity category, movie category, music category, novel category, POI (Point of Information, point of information) category, and so on.

Step 203: performing information search based on the search information, to obtain a search result.

In this embodiment, the execution entity may search for information based on the search information entered by the user through the terminal, to obtain a search result. Here, the search result may include title, abstract, and so on. As an example, the search result may be result of a text category.

In some alternative implementations of the present embodiment, step 203 may be performed as follows: the execution entity may first perform word segmentation on the search information to obtain at least one segmented word. After that, the execution entity may search for relevant information from Internet data based on the obtained at least one segmented word, and acquire a search result based on the relevant information obtained from the search. Here, the Internet data may refer to data collected from the Internet by web crawlers.

Step 204: screening, based on feature information of the search result, the at least one information card to obtain a target information card.

In this embodiment, the execution entity may first determine the feature information of the search result based on the search result obtained in step 203. As an example, the feature information of the search result may include the keyword information of a keyword in the title and the abstract. Here, the keyword information may include the location information of the keyword, the statistics for the keyword (for example, the statistics on the number of occurrences), and so on. Here, the location information of the keyword may refer to the location information of the keyword in the title or abstract. In practice, which information is included in the feature information of the search result may be determined according to the user's actual demand. After that, the execution entity may screen the at least one information card obtained in step 202 based on the determined feature information of the search result, and determine the target information card from the at least one information card according to the screening result.

In some alternative implementations of the present embodiment, the foregoing step 204 may be performed as follows: for each of the at least one information card, the execution entity may perform the following second screening steps:

First, the feature information and the category of the information card are marched with a preset feature combination.

In this implementation, a plurality of feature combinations may be pre-stored in the execution entity, and the screening information corresponding to each feature combination may be preset. The screening information may include display and non-display. In this way, the execution entity may match the feature information of the search result and the category of the information card with the plurality of feature combinations. Here, the plurality of feature combinations may be set according to the actual demand.

Then, whether the information card is the target information card is determined based on the marching result.

In this implementation, the execution entity may determine whether the information card is the target information card based on the marching result. As an example, the execution entity may determine, from the plurality of feature combinations, the feature combination that matches the feature information of the search result and the category of the information card, and determine the screening information corresponding to the matching feature combination. If the screening information is display, it may be determined that the information card is the target information card; if the screening information is non-display, it may be determined that the information card is not the target information card. As an example, that the feature information of the search result and the category of the information card match a feature combination may refer to they are the same or similar. For example, if the feature information of the search result and the category of the information card include all features in a feature combination, then it may be determined that the feature information of the search result and the category of the information card match the feature combination.

Step 205: sending to-be-displayed information to the terminal based on the target information card and the search result.

In this implementation, the execution entity may send the to-be-displayed information to the aforementioned terminal based on the target information card obtained in step 204 and the search result obtained in step 203, for the terminal to display the to-be-displayed information. As an example, the execution entity may send the target information card and the search result as the to-be-displayed information to the terminal.

In some alternative implementations of the present embodiment, the step 205 may be performed as follows:

First, scoring the target information card and the search result based on attribute information and the similarities to the search information, and sorting the target information card and the search result according to the results of scoring.

In this implementation, the execution entity may sort the target information card and search result. Particularly, first, the execution entity may calculate the similarity between the information contained in the target information card and the search information, and calculate the similarity between the search result and the search information. After that, the execution entity may also determine the attribute information of the target information card and the attribute information of the search result. Here, the attribute information may include the information provider, style (such as card style, text style, etc.), and so on. Scores may be set for attribute information in advance. For example, different scores may be set for different information providers, and different scores may be set for different styles. Finally, the execution entity may weighted sum (i.e., scoring) the correlations of each target information card and the search result, and the scores corresponding to the attribute information, and then the weighted sum result is used as the scoring result. The execution entity may further sort the target information card and search result according to the scoring results.

Then, the sorted target information card and search result are sent to the terminal as the to-be-displayed information.

In this implementation, the execution entity may send the sorted target information card and search result to the terminal as the to-be-displayed information by the terminal. Through this implementation, the execution entity may send the sorted target information card and search results to the terminal, where the target information card may be sorted in front of the search result. Since the target information card contains rich information, the richness of the information displayed by the terminal may be increased, and the user's experience may be improved.

Figure 3:
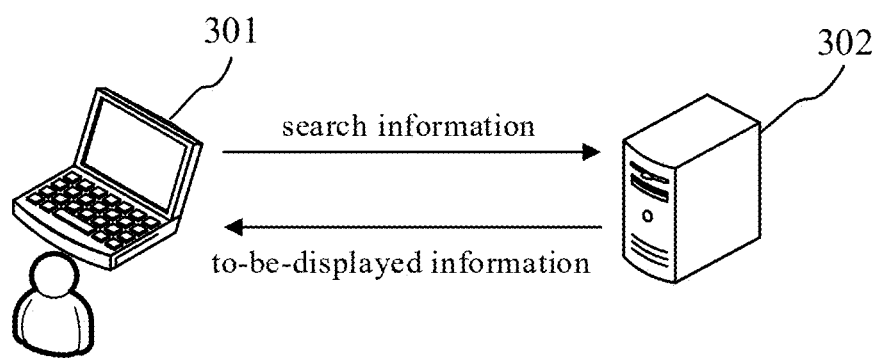
FIG. 3 is a schematic diagram of an application scenario of the method for sending information according to embodiments of the present disclosure.

Continue to refer to FIG. 3, which is a schematic diagram of an application scenario of the method for sending information according to the present embodiment. In the application scenario of FIG. 3, the user first inputs search information via the terminal 301, and the server 302 performs demand identification on the inputted search information to obtain the user's demand. Secondly, the server 302 obtains a plurality of information cards from a plurality of categories of preset information sets based on the user's demand. After that, the server 302 performs information search based on the search information, and obtains the search result. Then, the server 302 screens the obtained plurality of information cards based on the feature information of the search result, to obtain the target information card. Finally, the server 302 sends the to-be-displayed information to the terminal 301 based on the target information card and the search result for the terminal 301 to display to the user.

The method provided by the foregoing embodiment of the present disclosure screens a plurality of information cards based on the search result, thereby making the information cards pushed to the terminal more accurately.

Figure 4:
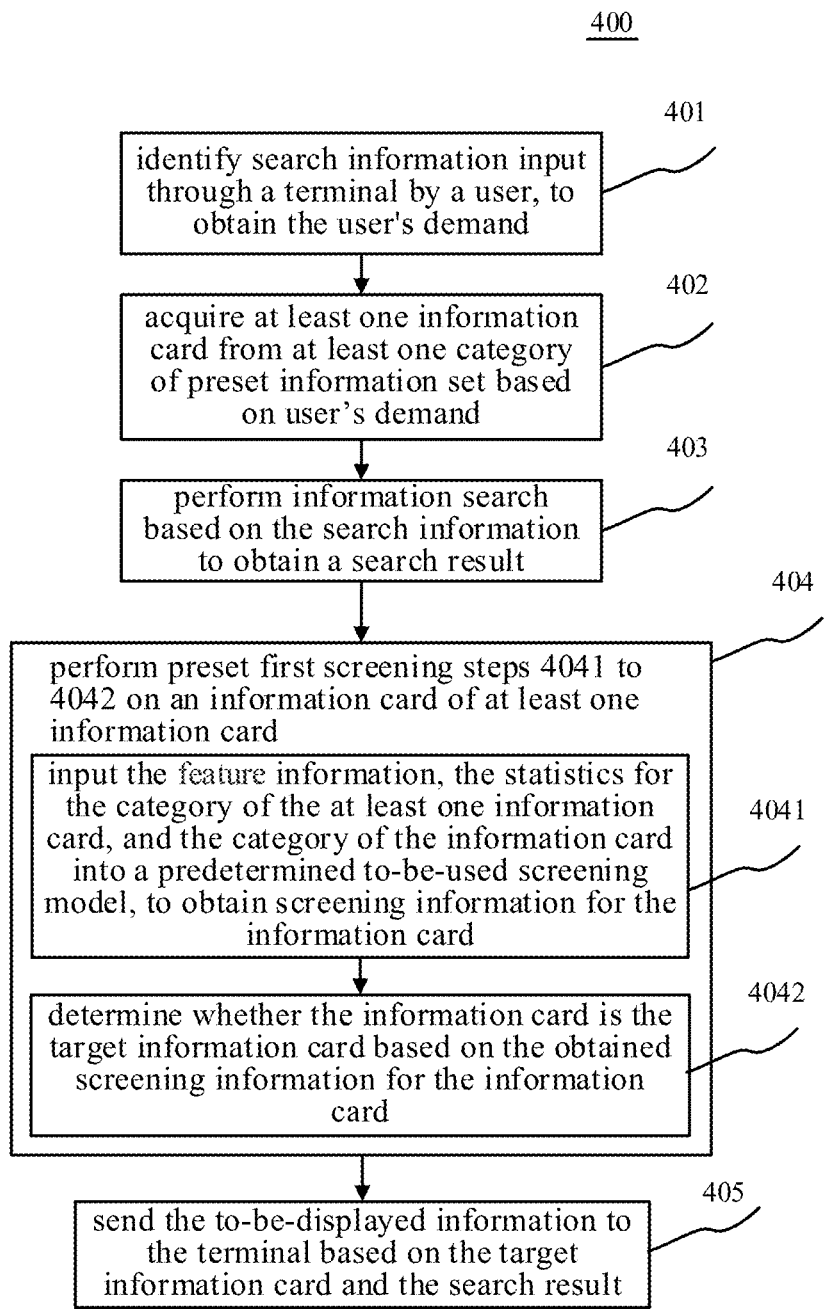
FIG. 4 is a flowchart of a method for sending information according to another embodiment of the present disclosure.

With further reference to FIG. 4, it shows a flow of a method 400 for sending information according to another embodiment. The method 400 for sending information includes the following steps:

Step 401: identifying search information input through a terminal by a user, to obtain the user's demand.

In this embodiment, step 401 is similar to step 201 in the embodiment shown in FIG. 2 and will not be repeated herein.

Step 402: acquiring at least one information card from at least one category of preset information set based on user's demand.

In this embodiment, step 402 is similar to step 202 in the embodiment shown in FIG. 2 and will not be repeated herein.

Step 403: performing information search based on the search information to obtain a search result.

In this embodiment, step 403 is similar to step 203 in the embodiment shown in FIG. 2 and will not be repeated herein.

Step 404: performing preset first screening steps 4041 to 4042 on an information card of the at least one information card.

In this embodiment, for each of the at least one information card obtained in step 402, the execution entity may execute the preset first screening steps 4041 to 4042.

At step 4041, the feature information, the statistics on the category of the at least one information card, and the category of the information card are input into a predetermined to-be-used screening model to obtain screening information for the information card.

In this embodiment, the execution entity may input the feature information of the search result, the statistics on the category of the at least one information card, and the category of the information card into a predetermined to-be-used screening model, so as to obtain screening information for the information card. Here, the statistics on the category of the at least one information card may include the number, the proportion, and the like of each category of the information cards in the at least one information card. Here, the to-be-used screening model may be used to characterize the corresponding relationship between the screening information and the feature information, the statistics for the category of the at least one information card, and category of the information card.

In some alternative implementations of the present embodiment, before step 4041, the above-mentioned first screening steps may further include: determining a to-be-used screening model from at least one pre-trained screening model according to the category of the information card.

In this embodiment, for each category of information card, a screening model for this category may be pre-established in the execution entity. In this way, for each information card in the at least one information card, the execution entity may determine, according to the category of the information card, a screening model for the category of the information card from at least one screening model as a to-be-used screening model. Here, the screening model may be a classification model obtained by using a machine learning method and trained with a preset sample set. The screening model may be used to characterize the corresponding relationship between the screening information and the feature information, the statistics for the category of the at least one information card, and the category of information card. Here, the feature information may be the feature information of the search result. Here, the screening information may be used to characterize whether to provide the information card to the terminal.

As an example, the screening model may be obtained through the following training steps executed by the execution entity mentioned above or other execution entities:

First, a sample set is obtained, where the samples in the sample set include sample feature information, sample statistics, the categories of sample information cards, and corresponding screening information.

Then, the screening model is obtained by training, with the sample feature information, sample statistics, and the categories of sample information cards of the samples in the sample set as inputs, and with the screening information corresponding to the input sample feature information, sample statistics, and categories of sample information cards as desired output.

At step 4042, whether the information card is the target information card is determined based on the obtained screening information for the information card.

In this embodiment, the execution entity may determine whether the information card is the target information card based on the screening information for the information card obtained in step 4041.

In some alternative implementations of the present embodiment, the screening information may include display and non-display, where display may mean sending information card to the terminal, and non-display may mean not sending information card to the terminal. And step 4042 may be performed as follows:

Firstly, determining that the information card is the target information card, in response to determine that the screening information for the information card is display.

In this implementation, if it is determined that the screening information for the information card is display, the execution entity may determine that the information card is the target information card.

Then, determining that the information card is not the target information card, in response to determining that the screening information for the information card is non-display.

In this implementation, if it is determined that the screening information for the information card is non-display, the execution entity may determine that the information card is not the target information card.

Step 405: sending the to-be-displayed information to the terminal based on the target information card and the search result.

In this embodiment, step 405 is similar to step 205 in the embodiment shown in FIG. 2 and will not be repeated herein.

It may be found from FIG. 4 that, compared with the embodiment corresponding to FIG. 2, the process 400 of the method for sending information in this embodiment highlights the screening, from at least one information card, a target information card for pushing based on the screening model. Therefore, the solution described in this embodiment may make the screened out target information card more accurate, so that the information card pushed to the terminal is more accurate.

Figure 5:
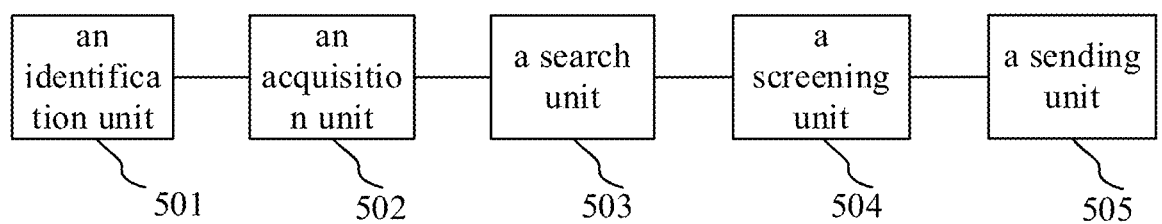
FIG. 5 is a schematic structural diagram of an apparatus for sending information according to an embodiment of the present disclosure.

With further reference to FIG. 5, as an implementation of the method shown in the above figures, an embodiment of the present disclosure provides an apparatus for sending information. The apparatus embodiment corresponds to the method embodiment shown in FIG. 2. The apparatus may be applied to various electronic equipment.

As shown in FIG. 5, the apparatus 500 for sending information in this embodiment includes: an identification unit 501, an acquisition unit 502, a search unit 503, a screening unit 504, and a sending unit 505. The identifying unit 501 is configured to identify search information input through a terminal by a user, to obtain the user's demand; the acquiring unit 502 is configured to acquire at least one piece of information from at least one category of preset information set based on the user's demand, where the information set includes information and an information cards for describing the information; the search unit 503 is configured to perform information search based on the above search information to obtain a search result; the screening unit 504 is configured to screen the at least one of information card based on the feature information of the above search result, to obtain the target information card; the sending unit 505 is configured to display the to-be-displayed information to the terminal based on the target information card and the search result.

In this embodiment, the processing of the identification unit 501, the acquisition unit 502, the search unit 503, the screening unit 504, and the sending unit 505 and the technical effects thereof may be referred to that discussed in corresponding embodiments in steps 201, 202, 203, 204 and 205 in FIG. 2 respectively, which will not be repeated herein.

In some alternative implementations of the present embodiment, the above-mentioned screening unit 504 includes: a first execution unit (not shown in the figure), configured to perform preset first screening steps on an information card of the at least one information card, where the first execution unit includes an input unit (not shown) and a card determination unit (not shown). The input unit is configured to input the feature information, statistics for the category of the at least one information card, and the category of the information card into a predetermined to-be-used screening model, to obtain screening information for the information card. The card determination unit is configured to determine whether the information card is the target information card based on the obtained screening information for the information card.

In some alternative implementations of the present embodiment, the first execution unit further includes a determining unit (not shown), configured to determine a to-be-used screening model from at least one pre-trained screening model according to the category of the information card, where the screening model is used to characterize a corresponding relationship between screening information and the feature information, the statistics for the category of the at least one information card, a category of an information card.

In some alternative implementations of the present embodiment, the screening information includes display and non-display; and the card determination unit is further configured to: determine that the information card is the target information card, in response to determining that the screening information for the information card is display; determine that the information card is not the target information card, in response to determining that the screening information for the information card is non-display.

In some alternative implementations of the present embodiment, the above mentioned screening unit 504 includes a second executive unit (not shown) configured to perform a second screening on an information card of the at least one information card, the second screening including: matching the feature information and a category of the information card with a preset feature combination; and determining whether the information card is the target information card based on the marching result.

In some alternative implementations of the present embodiment, the above mentioned sending unit further configured to: score the target information card and the search result based on a similarities with the search information and attribute information, and sort the target information card and the search result according to the scoring results; send the sorted target information card and search result to the terminal as the to-be-displayed information.

In some alternative implementations of the present embodiment, the screening unit is further configured to: segment the search information to obtain at least one segmented word; and search information from Internet data based on the obtained at least one segmented word, to obtain the search result.

Figure 6:
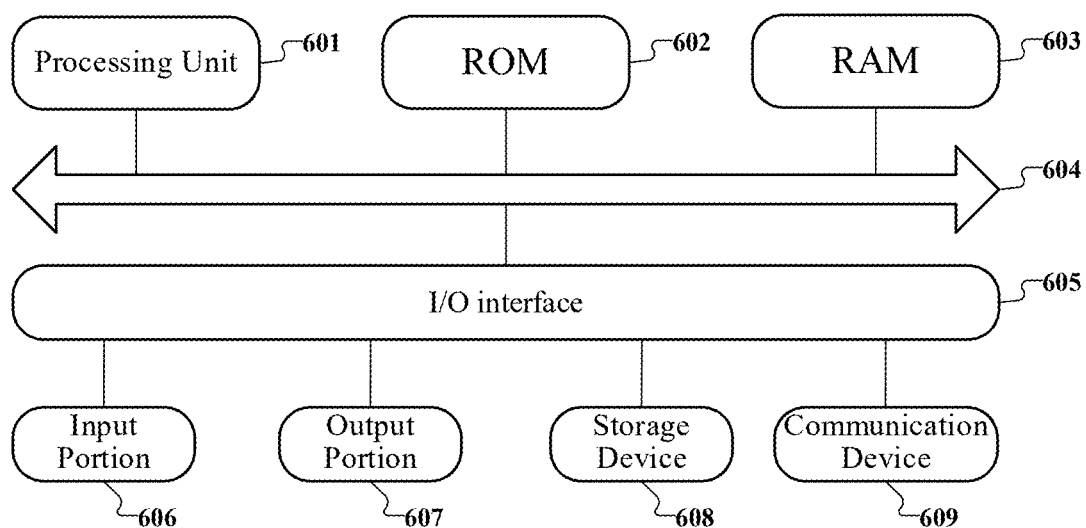
FIG. 6 is a schematic structural diagram of a computer system suitable for implementing a server according to embodiments of the present disclosure.

As shown in FIG. 6, which shows a schematic structural diagram of an electronic device 600 (for example, the server in FIG. 1) applied for implementing embodiments of the present disclosure. The server shown in FIG. 6 is only an example, and should not bring any limitation to the function and usage range of embodiments of the present disclosure.

As shown in FIG. 6, the electronic device 600 may include a processing unit (such as a central processing unit, a graphics processing unit) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the electronic device 600. The processing unit 601, the ROM 602 and the RAM 603 are connected to each other through a bus 604. An input/output (I/O) interface 605 is also connected to the bus X604.

Generally, the following components are connected to the I/O interface 605: an input portion 606 including a touch screen, a touch pad, a keyboard, a mouse, a camera, a microphone, an accelerometer, a gyroscope, etc.; an output portion 607 including a liquid crystal display device (LCD), a speaker, a vibrator, etc.; a storage portion 608 including a tape, a hard disk and the like; and a communication portion 609. The communication portion 609 allows the electronic device 600 to communicate with other devices to exchange data through wired or wireless communication. Although FIG. 6 shows an electronic device 600 with a variety of components, it should be understood that the implementation or possession of all the components shown is not required. More or fewer components may be implemented or available alternatively. Each of the boxes shown in FIG. 6 may represent one component or as many components as needed.

In particular, according to embodiments of the present disclosure, the process described above with reference to the flow chart may be implemented in a computer software program. For example, an embodiment of the present disclosure includes a computer program product, which includes a computer program that is hosted in a machine-readable medium. The computer program includes program codes for executing the method as illustrated in the flow chart. In such an embodiment, the computer program may be downloaded and installed from a network via the communication portion 609, or may be installed from the storage portion 608, or may be installed from the ROM 602. The computer program, when executed by the processing unit 601, implements the above mentioned functionalities as defined by the methods of the present disclosure.

It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The computer-readable storage medium described above may be the computer storage medium included in the electronic device in the above described embodiments, or a stand-alone computer-readable storage medium not assembled into the electronic device. The computer-readable storage medium stores one or more programs. The one or more programs, when executed by a device, cause the device to: identify search information input through a terminal by a user, to obtain the user's demand; acquire, based on the user's demand, at least one information card from at least one category of preset information set, where the information set includes information and information cards used to describe the information; perform information search based on the search information, to obtain a search result; screen, based on feature information of the search result, the at least one information card to obtain a target information card; and send to-be-displayed information to the terminal based on the target information card and the search result.

The computer program code for executing operations in some embodiments of the present disclosure may be compiled using one or more programming languages or combinations thereof. The programming languages include objectoriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in embodiments of the present disclosure may be implemented by means of software or hardware. The described units or modules may also be provided in a processor, for example, described as: a processor, including an identification unit, an acquisition unit, a search unit, a screening unit and a sending unit, where the names of these units or modules do not in some cases constitute a limitation to such units or modules themselves. For example, the identification unit may also be described as "a unit for identifying search information input through a terminal by a user, to obtain the user's demand".

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for sending information, the method being performed by a processor, the method comprising:
    identifying search information input through a terminal to obtain a user demand;
    acquiring, based on the user demand, a plurality of information cards from at least one category of preset information set, wherein a preset information set comprises information and information cards used to describe the information, wherein an information card is a result of integrating and visualizing various kinds of information, and the information card is an entry to the various kinds of information and contains a picture and a play link;
    searching information from Internet data collected by web crawlers based on the search information, to obtain a search result from the Internet data, the search result is a result of a text category, and determining feature information of the search result, wherein the feature information of the search result comprises locations of a keyword in a title and an abstract of the search result and statistics on a number of occurrences of the keyword in the title and the abstract of the search result;
    screening, based on feature information of the search result obtained from the Internet data, the plurality of information cards to obtain a target information card; and
    sending the target information card and the search result to the terminal as to-be-displayed information, and displaying on the terminal the target information card and the search result, so that various kinds of information integrated by the target information card is accessible through the target information card displayed on the terminal,
    wherein the screening, based on the feature information of the search result obtained from the Internet data, the plurality of information cards to obtain the target information card comprises:
    performing a first screening on an information card of the plurality of information cards, comprising:
    inputting the feature information of the search result, statistics for categories of the plurality of information cards, and a category of the information card into a to-be-used screening model, to obtain screening information for the information card, wherein the to-be-used screening model is pre-trained with a preset sample set by using a machine learning method, the statistics for categories of the plurality of information cards includes numbers and proportions of the categories of the plurality of information cards, wherein the screening information for the information card is display or non-display; and
    determining that the information card is the target information card, in response to determining that the screening information for the information card is display.

2. The method of claim 1, wherein the performing the first screening comprises:
    determining, based on the category of the information card, the to-be-used screening model from at least one screening model trained in advance.

3. The method of claim 1, wherein the determining whether the information card is the target information card based on the obtained screening information for the information card comprises:
    determining that the information card is not the target information card, in response to determining that the screening information for the information card is non-display.

4. The method of claim 1, wherein the screening, based on the feature information of the search result, the plurality of information cards to obtain the target information card comprises:
    performing a second screening on an information card of the plurality of information cards, comprising:

matching the feature information and the category of the information card with a preset feature combination; and determining whether the information card is the target information card based on result of the matching.

5. The method of claim 1, wherein the sending the target information card and the search result to the terminal as the to-be-displayed information comprises:

calculating a similarity between information contained in the target information card and the search information, and calculating a similarity between the search result and the search information;

determining attribute information of the target information card and attribute information of the search result, wherein different scores are set for different attribute information;

performing weighted sum on correlations of each target information card and the search result and scores corresponding to the attribute information, to obtain a result of the scoring;

sorting the target information card and the search result according to results of the scoring; and sending the sorted target information card and search result to the terminal as the to-be-displayed information.

6. The method of claim 1, wherein the searching information from Internet data based on the search information to obtain the search result comprise:

segmenting the search information to obtain at least one segmented word; and searching information from the Internet data based on the obtained at least one segmented word, to obtain the search result.

7. A server, comprising:
one or more processors;
a storage device, on which one or more programs are stored,
the one or more programs, when executed by the one or more processors, cause the one or more processors to implement operations comprising:

identifying search information input through a terminal to obtain a user demand;

acquiring, based on the user demand, a plurality of information cards from at least one category of preset information set, wherein a preset information set comprises information and information cards used to describe the information, wherein an information card is a result of integrating and visualizing various kinds of information, and the information card is an entry to the various kinds of information and contains a picture and a play link;

searching information from Internet data collected by web crawlers based on the search information, to obtain a search result from the Internet data, the search result is a result of a text category, and determining feature information of the search result, wherein the feature information of the search result comprises locations of a keyword in a title and an abstract of the search result and statistics on a number of occurrences of the keyword in the title and the abstract of the search result;

screening, based on feature information of the search result obtained from the Internet data, the plurality of information cards to obtain a target information card; and sending the target information card and the search result to the terminal as to-be-displayed information, and displaying on the terminal the target information card and the search result, so that various kinds of information integrated by the target information card is accessible through the target information card displayed on the terminal, wherein the screening, based on the feature information of the search result obtained from the Internet data, the plurality of information cards to obtain the target information card comprises:

performing a first screening on an information card of the plurality of information cards, comprising:

inputting the feature information of the search result, statistics for categories of the plurality of information cards, and a category of the information card into a to-be-used screening model, to obtain screening information for the information card, wherein the to-be-used screening model is pre-trained with a preset sample set by using a machine learning method, the statistics for categories of the plurality of information cards includes numbers and proportions of the categories of the plurality of information cards, wherein the screening information for the information card is display or non-display; and determining that the information card is the target information card, in response to determining that the screening information for the information card is display.

8. The server of claim 7, wherein the performing the first screening comprises:

determining, based on the category of the information card, the to-be-used screening model from at least one screening model trained in advance.

9. The server of claim 7, wherein the determining whether the information card is the target information card based on the obtained screening information for the information card comprises:

determining that the information card is not the target information card, in response to determining that the screening information for the information card is non-display.

10. The server of claim 7, wherein the screening, based on the feature information of the search result, the plurality of information cards to obtain the target information card comprises:

performing a second screening on an information card of the plurality of information cards, comprising:

matching the feature information and the category of the information card with a preset feature combination; and determining whether the information card is the target information card based on result of the matching.

11. The server of claim 7, wherein the sending the target information card and the search result to the terminal as the to-be-displayed information comprises:

calculating a similarity between information contained in the target information card and the search information, and calculating a similarity between the search result and the search information;

determining attribute information of the target information card and attribute information of the search result, wherein different scores are set for different attribute information;

performing weighted sum on correlations of each target information card and the search result and scores corresponding to the attribute information, to obtain a result of the scoring;

sorting the target information card and the search result according to results of the scoring; and sending the sorted target information card and search result to the terminal as the to-be-displayed information.

12. The server of claim 7, wherein the searching information from Internet data based on the search information to obtain the search result comprise:

segmenting the search information to obtain at least one segmented word; and searching information from the Internet data based on the obtained at least one segmented word, to obtain the search result.

13. A non-transitory computer readable medium storing one or more computer programs that, when executed by a processor, cause the processor to implement operations, the operations comprising:

identifying search information input through a terminal to obtain a user demand;

acquiring, based on the user demand, a plurality of information cards from at least one category of preset information set, wherein a preset information set comprises information and information cards used to describe the information, wherein an information card is a result of integrating and visualizing various kinds of information, and the information card is an entry to the various kinds of information and contains a picture and a play link;

searching information from Internet data collected by web crawlers based on the search information, to obtain a search result from the Internet data, the search result is a result of a text category, and determining feature information of the search result, wherein the feature information of the search result comprises locations of a keyword in a title and an abstract of the search result and statistics on a number of occurrences of the keyword in the title and the abstract of the search result;

screening, based on feature information of the search result obtained from the Internet data, the plurality information cards to obtain a target information card; and sending the target information card and the search result to the terminal as to-be-displayed information, and displaying on the terminal the target information card and the search result, so that various kinds of information integrated by the target information card is accessible through the target information card displayed on the terminal, wherein the screening, based on the feature information of the search result obtained from the Internet data, the plurality of information cards to obtain the target information card comprises:

performing a first screening on an information card of the plurality of information cards, comprising:

inputting the feature information of the search result, statistics for categories of the plurality of information cards, and a category of the information card into a to-be-used screening model, to obtain screening information for the information card, wherein the to-be-used screening model is pre-trained with a preset sample set by using a machine learning method, the statistics for categories of the plurality of information cards includes numbers and proportions of the categories of the plurality of information cards, wherein the screening information for the information card is display or non-display; and determining that the information card is the target information card, in response to determining that the screening information for the information card is display.

14. The medium of claim 13, wherein the performing the first screening comprises:

determining, based on the category of the information card, the to-be-used screening model from at least one screening model trained in advance.

15. The medium of claim 13, wherein the determining whether the information card is the target information card based on the obtained screening information for the information card comprises:

determining that the information card is not the target information card, in response to determining that the screening information for the information card is non-display.

16. The medium of claim 13, wherein the screening, based on the feature information of the search result, the plurality of information cards to obtain the target information card comprises:

performing a second screening on an information card of the plurality of information cards, comprising:

matching the feature information and the category of the information card with a preset feature combination; and determining whether the information card is the target information card based on result of the matching.

* * * * *